(12) United States Patent
Miura (10) Patent No.: US 10,089,757 B2
(45) Date of Patent: Oct. 2, 2018

(54) IMAGE PROCESSING APPARATUS, IMAGE PROCESSING METHOD, AND NON-TRANSITORY COMPUTER READABLE STORAGE MEDIUM

(71) Applicant: CANON KABUSHIKI KAISHA, Tokyo (JP)

(72) Inventor: Shoko Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 15/094,274

(22) Filed: Apr. 8, 2016

(65) Prior Publication Data

US 2016/0307339 A1 Oct. 20, 2016

(30) Foreign Application Priority Data

Apr. 15, 2015 (JP) .................................. 2015-083706

(51) Int. Cl.
*G06K 9/00* (2006.01)
*G06T 11/00* (2006.01)

(52) U.S. Cl.
CPC ........ *G06T 11/005* (2013.01); *G06T 2210/52* (2013.01); *G06T 2211/421* (2013.01); *G06T 2211/424* (2013.01)

(58) Field of Classification Search
CPC combination set(s) only.
See application file for complete search history.

(56) References Cited

U.S. PATENT DOCUMENTS

2010/0213937 A1* 8/2010 Nagao .................... A61B 5/055
324/309
2012/0207355 A1* 8/2012 Kokubun ............... A61B 6/503
382/103

FOREIGN PATENT DOCUMENTS

JP 2011-072827 A 4/2011

OTHER PUBLICATIONS

Bahi et al., "High Performance Multi-GPU Acceleration for Fully 3D List-Mode PET Reconstruction", 2012 IEEE Nuclear Science Symposium and Medical Imaging Conference Record, pp. 3390-3393, 2012.

* cited by examiner

*Primary Examiner* — Nirav G Patel
(74) *Attorney, Agent, or Firm* — Carter, Deluca, Farrell & Schmidt, LLP (57) ABSTRACT

An image processing obtains a plurality of measurement data from a measurement apparatus for obtaining the plurality of measurement data of an object, divides the plurality of measurement data into a plurality of subsets, distributes the measurement data included in the plurality of subsets to operation units in each repetitive operation, divides an image region into a plurality of regions, distributes the plurality of regions to the operation units, updates a result obtained by each operation unit in the distributed region information using the distributed measurement data, thereby performing the reconstruction process and generating a partial reconstructed image on each operation unit, and combines the partial reconstructed images to generate the reconstructed image.

11 Claims, 8 Drawing Sheets

IMAGE PROCESSING APPARATUS, IMAGE PROCESSING METHOD, AND NON-TRANSITORY COMPUTER READABLE STORAGE MEDIUM

BACKGROUND OF THE INVENTION

Field of the Invention

The present invention relates to an image reconstruction process of an image diagnostic apparatus that forms a tomographic image in an object.

Description of the Related Art

An image diagnostic apparatus that forms a tomographic image in an object forms a tomographic image using radiation. The tomographic image is used for diagnosis of a patient by a doctor or the like. Such an image diagnostic apparatus performs an image reconstruction process to obtain the tomographic image. An image diagnostic apparatus such as an X-ray computed tomography (CT) apparatus, a positron emission tomography (PET) apparatus, or a single photon emission CT (SPECT) apparatus includes projection calculation in the image reconstruction process.

Image reconstruction processing methods including projection calculation are roughly divided into analytical methods and successive approximation. In the analytical methods, the processing load is light, but the quality of a reconstructed image is low. In the successive approximation, although the processing load is heavy, the image quality can be expected to be improved by reducing noise on a reconstructed image. One of the successive approximation image reconstruction methods is a block iteration type successive approximation image reconstruction method.

Conventionally, when performing the image reconstruction process using a plurality of operation units, measurement data (tomogram data of an object) obtained by the image diagnostic apparatus is distributed among the operation units, and after that, the plurality of operation units perform parallel processes, as described in Japanese Patent Laid-Open No. 2011-72827. In this case, if an image region (image space) to be calculated can be specified from the measurement data, only the image region is distributed among the operation units. If the image region cannot be specified, the data of the whole image region is distributed among the operation units. In addition, to shorten the data transfer time among the operation units, divided images are distributed to the operation units, and parallel processes are performed, as described in Zakaria Bahi, Julien Bert, Awen Autret and Dimitris Visvikis, "High Performance Multi-GPU Acceleration for Fully 3D List-Mode PET Reconstruction", 2012 IEEE Nuclear Science Symposium and Medical Imaging Conference Record, 2012.

When forming a detailed tomographic image in an object, measurement data (tomogram data of the object) is obtained in a large scale. Hence, an image reconstruction processing method for handling the large-scale measurement data using a plurality of operation units is indispensable. However, since an image reconstruction process using the large-scale measurement data or reconstructed image data is performed, the data amount exceeds the memory size of the operation units.

SUMMARY OF THE INVENTION

The present invention has been made in consideration of the above problem, and has as its object to implement an image reconstruction method for handling large-scale data.

According to one aspect of the present invention, there is provided an image processing apparatus for generating a reconstructed image by performing a reconstruction process including a repetitive operation using a plurality of operation units, which comprises: an obtaining unit configured to obtain a plurality of measurement data from a measurement apparatus for obtaining the plurality of measurement data of an object; a first division unit configured to divide the plurality of measurement data into a plurality of subsets; a first distribution unit configured to distribute the measurement data included in the plurality of subsets to the operation units in each repetitive operation; a second division unit configured to divide an image region into a plurality of regions; a second distribution unit configured to distribute the plurality of regions to the operation units; a reconstruction processing unit configured to update a result obtained by each operation unit in the distributed region information using the distributed measurement data, thereby performing the reconstruction process and generating a partial reconstructed image on each operation unit; and a combining unit configured to combine the partial reconstructed images to generate the reconstructed image.

According to another aspect of the present invention, there is provided an image processing apparatus for generating a reconstructed image by performing a reconstruction process including a repetitive operation using a plurality of operation units, which comprises: a measurement data division unit configured to divide measurement data that is tomogram data of an object; a measurement data distribution unit configured to distribute the measurement data divided by the measurement data division unit to the operation units; an image data division unit configured to divide image data that is volume data of the object; an image data distribution unit configured to distribute the image data divided by the image data division unit to the operation units; a reconstruction processing unit configured to perform, in the operation units, reconstruction processes including repetitive operations in parallel using the measurement data and the image data distributed to the operation units to generate a partial reconstructed image; and a combining unit configured to combine the partial reconstructed images generated by the operation units.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention. Note that the same parts will be described by adding the same reference numerals.

First Embodiment

Figure 1:
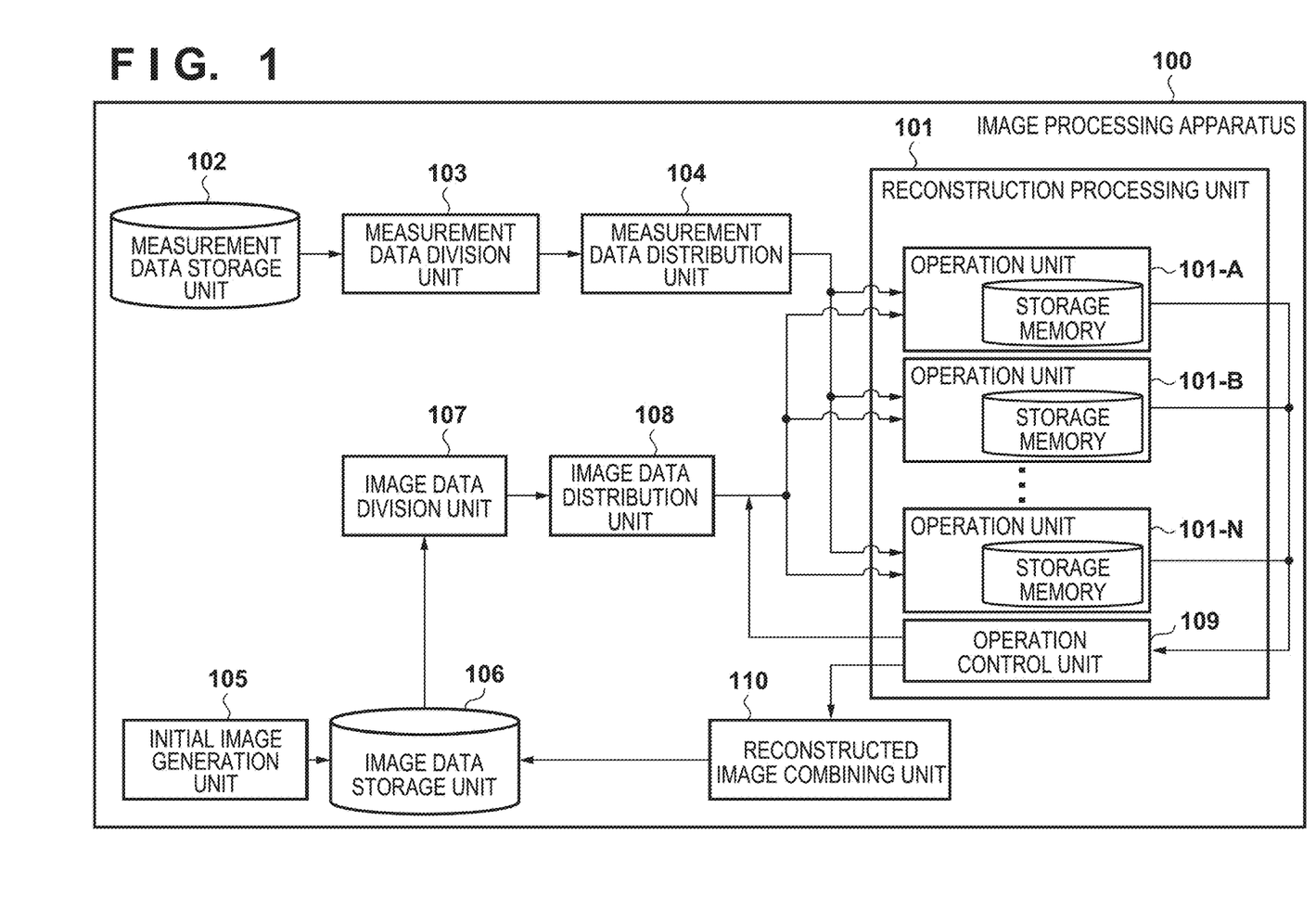
FIG. 1 is a functional block diagram showing an example of the arrangement of an image processing apparatus 100.

FIG. 1 is a functional block diagram showing an example of the arrangement of an image processing apparatus 100 according to the first embodiment. The image processing apparatus 100 performs reconstruction processes including repetitive operations in parallel using a plurality of operation units to generate a reconstructed image. Main parts of the image processing apparatus 100 will be described below. The image processing apparatus may include other processing units. An image reconstruction processing unit 101 is formed from a plurality of operation units and performs an image reconstruction process. More specifically, the image reconstruction processing unit 101 updates a result obtained by each operation unit in distributed region information using distributed measurement data, thereby performing a reconstruction process and generating a partial reconstructed image on each operation unit. Details will be described later. Each operation unit incorporates a storage memory. The storage memory stores distributed measurement data (tomogram data of an object) (to be described later) and image data.

Measurement data are data obtained by measuring tomograms of an object from different angles using radiation. On the other hand, image data is volume data that can be obtained as a result of the image reconstruction process according to this embodiment. As initial image data, for example, data generated by substituting a predetermined value in a range to be subjected to imaging and 0 in a range not to be subjected to imaging is used, as will be described later.

Operation processes by the operation units are performed in parallel. The operation units operate on GPUs or CPUs. Note that the operation units used are not limited to those operating on GPUs or CPUs. An operation control unit 109 performs a process of aggregating/adding the results of the image reconstruction processes executed by the plurality of operation units in the image reconstruction processing unit 101 and distributing the result to the operation units. Note that the operation control unit 109 is not limited to that operating on a GPU or CPU.

Figure 4:
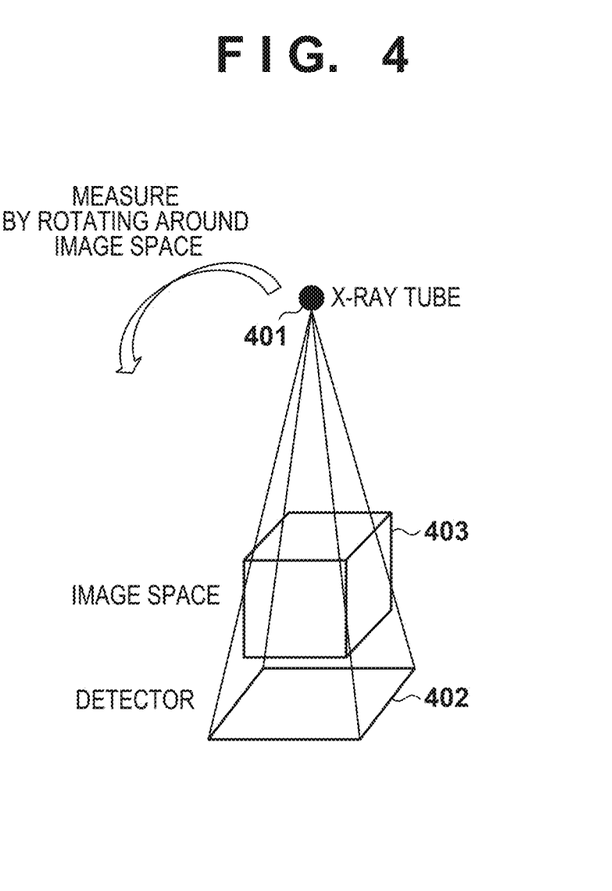
FIG. 4 is a schematic view of an image diagnostic apparatus according to the first embodiment.

A measurement data storage unit 102 obtains a plurality of measurement data (tomogram data of an object) from a tomogram measurement apparatus that obtains the plurality of measurement data from the object and stores the measurement data. FIG. 4 illustrates the arrangement of the tomogram measurement apparatus according to this embodiment. The tomogram measurement apparatus obtains a plurality of measurement data. As shown in FIG. 4, the tomogram measurement apparatus is a computed tomography (CT) apparatus that is a medical image diagnostic apparatus including an X-ray tube 401 configured to irradiate an object with X-rays and a detector 402 configured to detect the X-rays that have irradiated the object, in which the X-ray tube 401 and the detector 402 are arranged so as to sandwich an image space 403 where imaging of the object is performed. Note that the shape of the X-rays emitted by the X-ray tube 401 is not limited to a specific one and can be a parallel beam, conical beam, or fan beam. The detector 402 is not limited to a flat detector as shown in FIG. 4.

A measurement data division unit 103 divides the measurement data that are the tomogram data of the object obtained by the tomogram measurement apparatus and stored in the measurement data storage unit 102 into a plurality of subsets. Each subset includes measurement data to be used by an operation unit in one iteration of the repetitive operation. A measurement data distribution unit 104 distributes the measurement data (divided measurement data) included in the subsets to the operation units in each repetitive operation. In this embodiment, the measurement data distribution unit 104 distributes identical data to the operation units.

An initial image generation unit 105 generates first image data. That is, the initial image generation unit 105 generates an initial image as an input image to the image reconstruction process. The initial image is generated by substituting a predetermined value in a range (imaging range) to be subjected to imaging and 0 in a range (a range outside the imaging range) not to be subjected to imaging in an imaging enable range (image region). As the value substituted in the imaging range, for example, a uniform value or a value calculated from measurement data is substituted. The method of calculating the value to be substituted is not limited to a specific method. An image data storage unit 106 stores, as image data, the initial image generated by the initial image generation unit 105 as the initial value. After the start of operations by the plurality of operation units, the image data storage unit 106 may store a reconstructed image generated by a reconstructed image combining unit 110 every time the image reconstruction process is performed.

An image data division unit 107 divides the image data (image region) as the volume data of the object into a plurality of regions as many as the number of operation units. At this time, the image data division unit 107 performs the division process such that the divided image data form a continuous region in a predetermined range. An image data distribution unit 108 distributes the divided image data (divided region information) to the operation units. The image data distribution unit 108 distributes different image data (a plurality of regions divided from the image region) to the operation units. The reconstructed image combining unit 110 combines the reconstructed images generated by the image reconstruction processes on the operation units.

Figure 2:
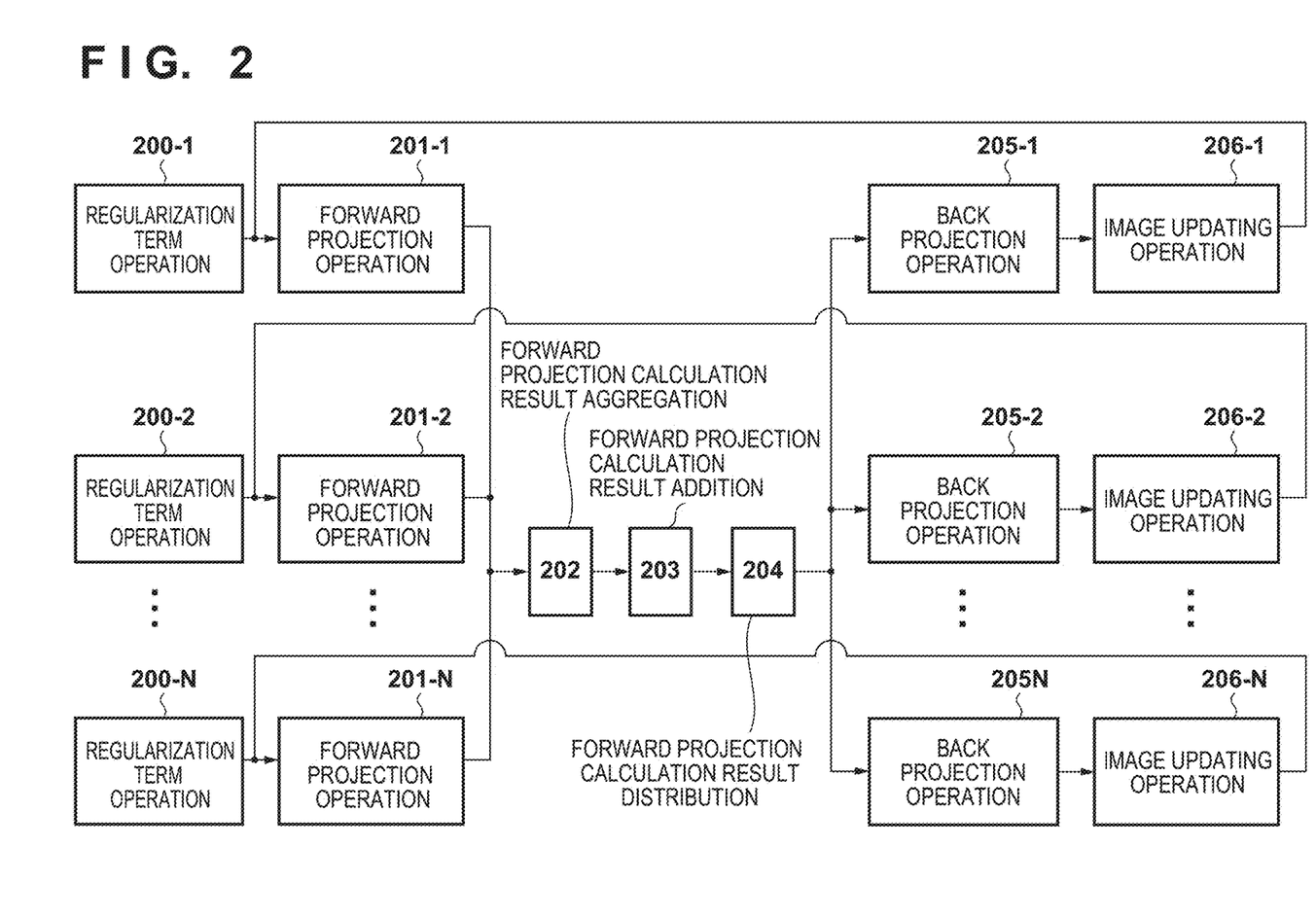
FIG. 2 is a view for explaining operations of a reconstruction process according to the first embodiment.

FIG. 2 is a view for explaining operations of the reconstruction process according to this embodiment. An operation unit 101-A performs a regularization term operation 200-A, a forward projection operation 201-A, a back projection operation 205-A, and an image updating operation 206-A. Similarly, operation units 101-B to 101-N perform regularization term operations 200-B to 200-N, forward projection operations 201-B to 201-N, back projection operations 205-B to 205-N, and image updating operations 206-B to 206-N, respectively. The operation control unit 109 performs forward projection operation result aggregation 202, forward projection operation result addition 203, and forward projection operation result distribution 204.

In the regularization term operations 200-A to 200-N, regularization terms are calculated. The regularization term is a value obtained by executing a back projection operation before an iterative process of the subsequent stage. In the forward projection operations 201-A to 201-N, forward projection operations are performed. The forward projection operation is a calculation of obtaining the sum of pixel values on a projection line.

In the forward projection operation result aggregation 202, forward projection operation results obtained by the forward projection operations 201-A to 201-N are aggregated. This aggregation process is executed by the operation control unit 109.

In the forward projection operation result addition 203, all the forward projection operation results aggregated in the forward projection operation result aggregation 202 are added. More specifically, in the forward projection operation result addition 203, the forward projection operation results obtained by the operation units 101-A to 101-N are added to form entire image data because the forward projection operation results correspond to different parts of image data, as will be described later. This addition process is executed by the operation control unit 109.

In the forward projection operation result distribution 204, the forward projection operation result added by the forward projection operation result addition 203 is distributed to the operation units 101-A to 101-N. This distribution process is executed by the operation control unit 109. More specifically, the added forward projection operation result is divided according to partial image data corresponding to the process results (the forward projection operation results before addition) of the operation units 101-A to 101-N and distributed.

In the back projection operations 205-A to 205-N, back projection operations are performed. More specifically, the back projection operation is a calculation of adding projection values. In the image updating operations 206-A to 206-N, operations for image updating are performed. More specifically, in the image updating operations 206-A to 206-N, back projection operation results obtained so far and the back projection operation results obtained this time are multiplied. After the end of this process, the process returns to the forward projection operations 201-A to 201-N, and an iterative process is performed.

Figure 3A:
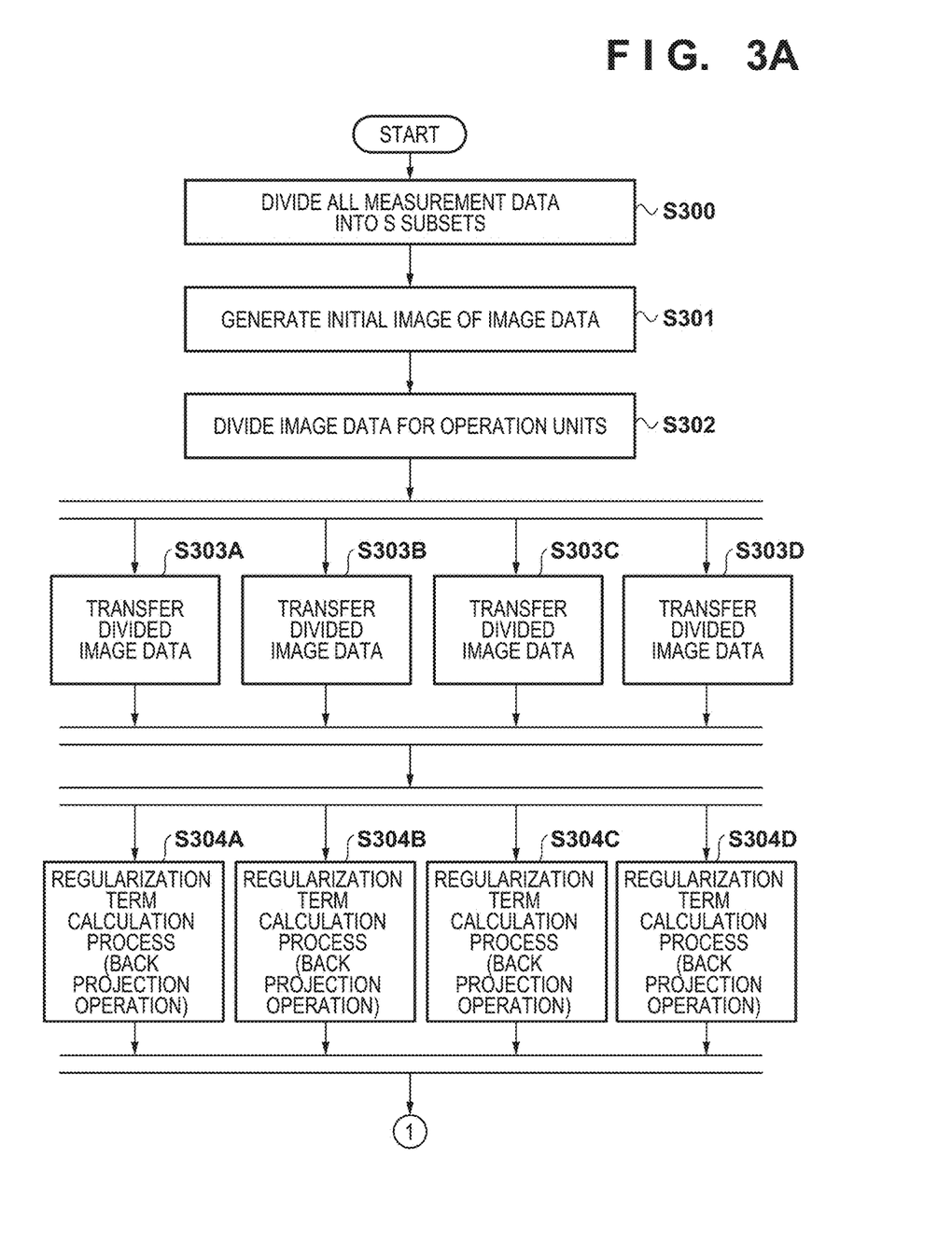
FIGS. 3A and 3B are flowcharts showing an example of a process form executed by the image processing apparatus 100.
Figure 3B:
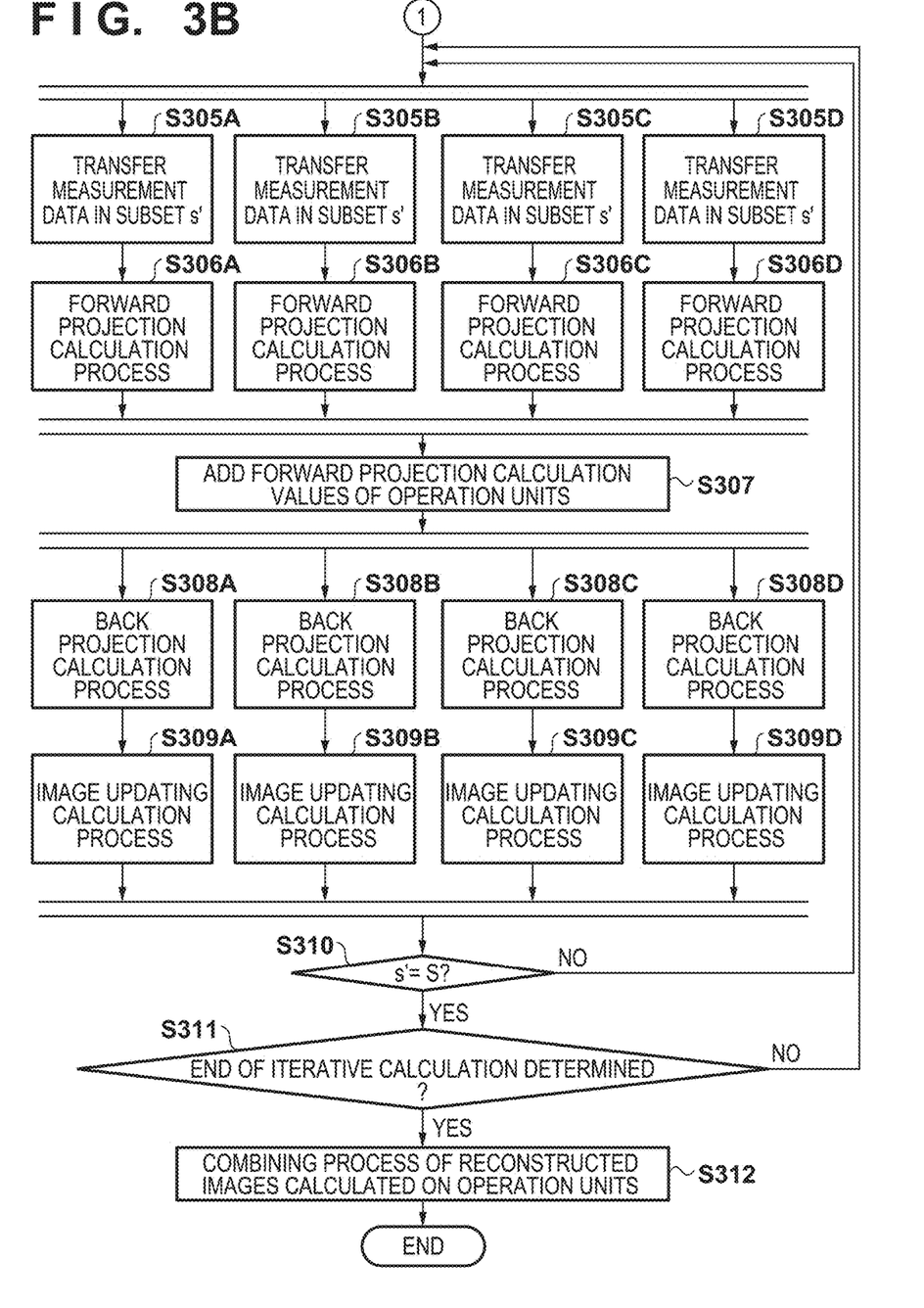
Figure 5:
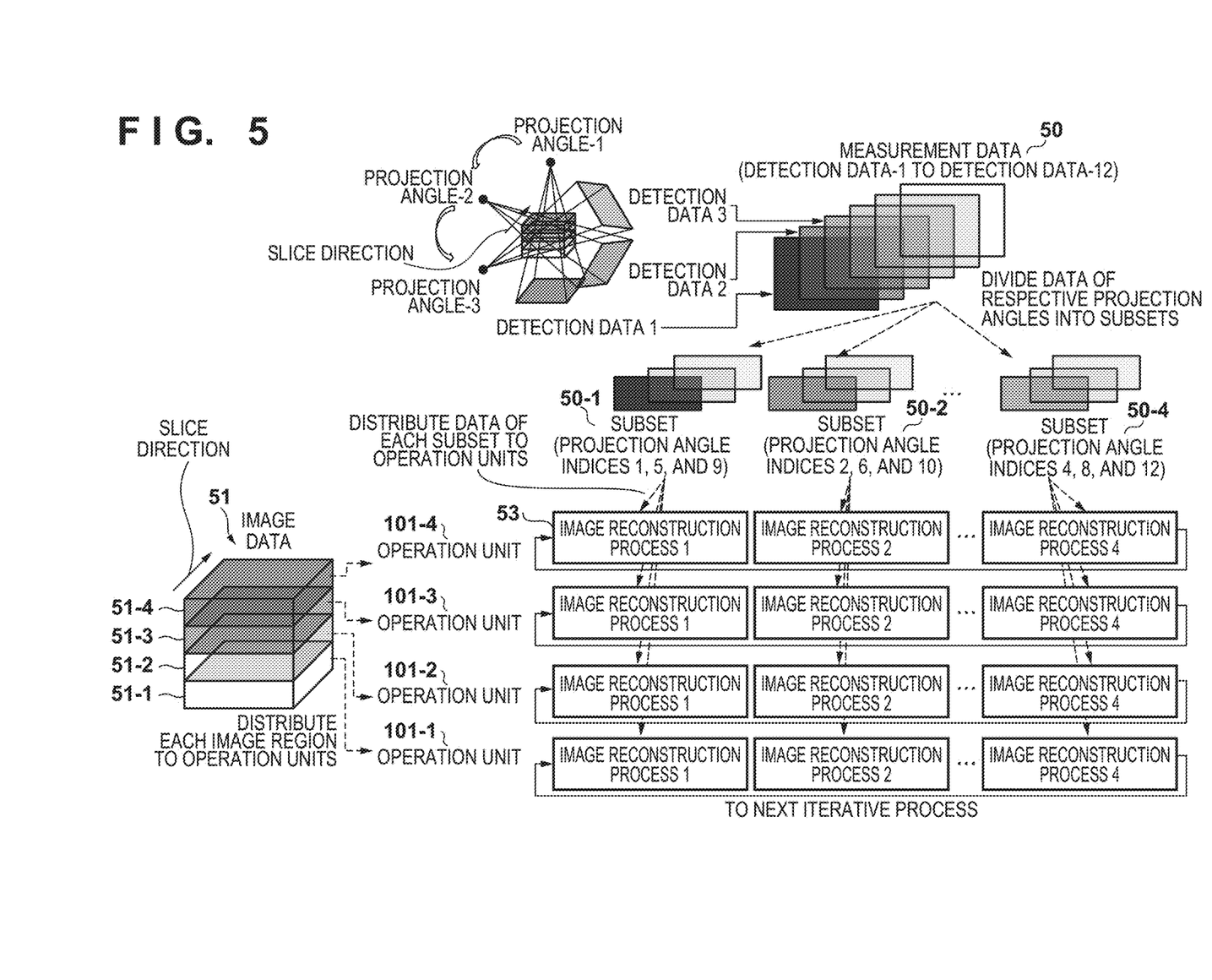
FIG. 5 is a conceptual view of processes according to the first embodiment.

FIGS. 3A and 3B are flowcharts showing an example of a process form executed by the image processing apparatus 100. FIG. 5 is a conceptual view of processes according to this embodiment, which will be described together with the process shown in FIGS. 3A and 3B. FIGS. 3 and 5 show an example in which the number (=N) of operation units is 4. In step S300, the measurement data division unit 103 divides measurement data stored in the measurement data storage unit 102 into S subsets. Each subset includes a data group to be used for calculation of one iteration. When dividing measurement data into subsets, the measurement data division unit 103 designates a specific view (projection angle) and divides the measurement data into subsets. That is, the measurement data division unit 103 divides a plurality of measurement data into a plurality of subsets such that each of the plurality of subsets includes measurement data of different projection angles. The specific view can arbitrarily be determined. In this embodiment, a projection angle index corresponding to a projection angle of irradiation is assumed to be added to each measurement data. The measurement data division unit 103 designates a projection angle index to be included in each subset without dividing the detection data of each projection angle, thereby dividing the plurality of measurement data into the plurality of subsets.

In the example shown in FIG. 5, the number of detection data included in measurement data 50 is 12, and the number (=S) of subsets is 4. At this time, the measurement data division unit 103 divides detection data of projection angle indices 1, 5, and 9 into a subset 50-1, detection data of projection angle indices 2, 6, and 10 into a subset 50-2, detection data of projection angle indices 3, 7, and 11 into a subset 50-3, and detection data of projection angle indices 4, 8, and 12 into a subset 50-4. Note that the method of designating the projection angle indices for division is not limited to the above example. In this way, the measurement data division unit 103 designates the projection angle indices and performs division, thereby dividing the measurement data without adding a process.

In step S301, the initial image generation unit 105 generates initial image data as an input image to the image reconstruction process. In this embodiment, the predetermined value to be substituted in a range (whole image region) to be subjected to imaging as the initial image is a uniform value calculated from the measurement data stored in the measurement data storage unit 102. Note that the value to be substituted is not limited to the above value.

In step S302, the image data division unit 107 performs an image data division process. At this time, the image data division unit 107 divides an image region into a plurality of regions such that each region has a predetermined continuous range. In addition, the image data division unit 107 divides the image region into a plurality of regions having the same range. Note that the division method at this time is not limited to a specific method. For example, in the image space, the horizontal direction in a slice section is defined as an X-axis direction, the vertical direction is defined as a Y-axis direction, and the slice direction is defined as a Z-axis direction. At this time, a division method of dividing an image by planes parallel to the X-axis direction (image data 51 is divided into image data 51-1 to 51-4), as shown in FIG. 5, is usable. Various other division methods such as dividing an image by planes parallel to the Y-axis direction or Z-axis direction and dividing an image in an oblique direction with respect to each axis are also usable. The divided regions need not be uniform among the operation units and can arbitrarily be determined. Note that in FIGS. 3A and 3B, the process advances from step S300 sequentially to steps S301 and S302. However, the process of step S300 and those of steps S301 and S302 may be replaced with each other.

The reason why an image reconstruction process for large-scale data that cannot be held on an operation unit can be performed will be described here in detail. When the image size is 1024×1024×1024 pixels, and a numerical value is handled as a float type, the amount of image data is about 4.3 GB. When the size of measurement data corresponding to this image size is 2048×1024×1024, and a numerical value is handled as a float type, the amount of the measurement data is about 8 GB.

As arrays that need to be ensured to calculate the image reconstruction method, there are an array that holds forward projection operation results, a regularization term array, and an array that holds back projection operation results in addition to the arrays of reconstructed images and measurement data. In this embodiment, the texture function of a GPU is used for high-speed implementation. Hence, two arrays of input reconstructed images and output reconstructed images are prepared for reconstructed images. Accordingly, two arrays for the measurement data size and four arrays for the reconstructed image size are needed in total. If all data are distributed to the operation units without being divided, a memory size of 30 GB or more is necessary. When the image reconstruction process is implemented by using four GPUs for the operation units and setting the number of subsets to 16, the sizes of data distributed to each operation unit are about 1.07 GB for divided image data and 0.5 GB for divided measurement data. Hence, the data size distributed to the GPU can be decreased to about 5.28 GB in total, and the data can be held on the memory of the GPU.

Referring back to FIGS. 3A and 3B, in steps S303A to S303D, the image data distribution unit 108 distributes the image data divided in step S302 to the operation units. This process corresponds to distributing the image data 51-1 to 51-4 divided from the image data 51 to operation units 101-1 to 101-4 in FIG. 5.

Next, the image reconstruction processing unit 101 performs the processes of steps S304 to S311, that is, the iterative calculation processes shown in FIG. 2. First, in steps S304A to S304D, the operation units 101-1 to 101-4 of the image reconstruction processing unit 101 execute the regularization term operations 200-A to 200-4. Next, in steps S305A to S305D, the measurement data distribution unit 104 distributes the measurement data divided in step S300 to the operation units. This process corresponds to distributing the detection data of projection angle index 1 of the subset 50-1 to the operation units 101-1 to 101-4 for one iterative process in FIG. 5. In steps S306A to S306D, the operation units 101-1 to 101-4 execute the forward projection operations 201-A to 201-4.

In step S307, the operation control unit 109 executes the forward projection operation result aggregation 202, the forward projection operation result addition 203, and the forward projection operation result distribution 204. In steps S308A to S308D, the operation units 101-1 to 101-4 execute the back projection operations 205-A to 205-4. In steps S309A to S309D, the operation units 101-1 to 101-4 execute the image updating operations 206-A to 206-4.

The processes of steps S305 to S309 in FIGS. 3A and 3B correspond to an image reconstruction process 53 in FIG. 5. The procedure of the image reconstruction process will be described with reference to FIG. 5. First, each of the operation units 101-1 to 101-4 performs one iterative process (image reconstruction process 1) for the detection data of projection angle index 1 out of the subset 50-1 to obtain a back projection result. Next, each of the operation units 101-1 to 101-4 performs one iterative process (image reconstruction process 1) for the detection data of projection angle index 5, and multiplies the back projection result obtained in this process by the back projection result obtained in the preceding process. Then, each of the operation units 101-1 to 101-4 performs one iterative process (image reconstruction process 1) for the detection data of projection angle index 9, and multiplies the back projection result obtained in this process by the back projection result obtained in the preceding process. After the iterative processes for the subset 50-1 have ended, the process target shifts to the subset 50-2. The iterative processes (image reconstruction processes 2) are performed for a plurality of projection angle indices, as in the subset 50-1.

In step S310, the operation control unit 109 determines the end of the subset calculation loop. If the loop has ended, the process advances to iterative calculation end determination in step S311. If the loop has not ended, the process returns to steps S305A to S305D to repeat the process. In step S311, the operation control unit 109 determines the end of iterative calculation. If the iterative calculation has ended, the process advances to a reconstructed image combining process in step S312. If the iterative calculation has not ended, the process returns to steps S305A to S305D to repeat the process. In the example of FIG. 5, if the end condition is not met after the end of the process up to the subset 50-4, image reconstruction process 1 is performed again. In this way, using the measurement data and image data distributed to the operation units, the image reconstruction processing unit 101 performs the image reconstruction processes including the repetitive operations in parallel in the operation units, thereby generating partial reconstructed images. In step S312, the reconstructed image combining unit 110 combines the partial reconstructed images generated by finally updating the distributed image data (distributed region information) in the operation units, thereby generating a reconstructed image.

In this embodiment, by performing such process control, a CT image reconstruction process for large-scale data can be implemented using a plurality of operation units. Since each operation unit can save only partial detection data divided by the projection angle and perform the iterative operation without saving all detection data that construct measurement data in a memory, the effect of decreasing the memory capacity can also be obtained.

Second Embodiment

In the first embodiment, a method of designating measurement data of each projection angle and dividing the measurement data in the image reconstruction process of a CT apparatus has been described. In this embodiment, concerning the image reconstruction process of a positron emission tomography (PET) apparatus that is a medical image diagnostic apparatus, an embodiment for measurement data having a list mode data format with time-serially recorded detection events (conditions for detection) will be described.

Figure 6:
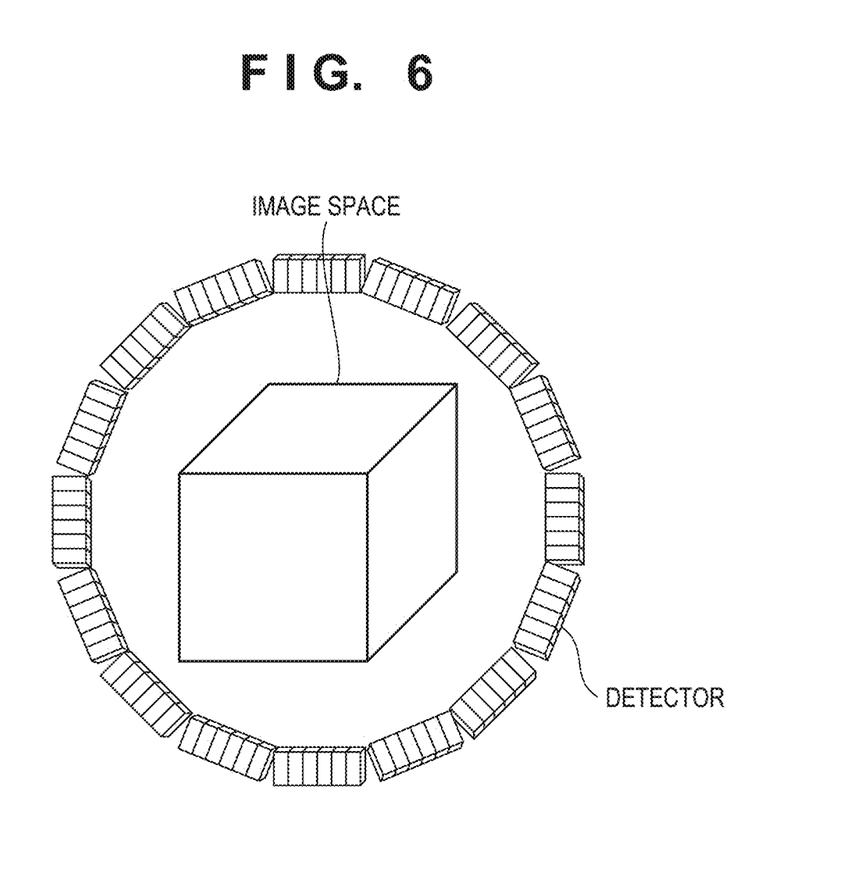
FIG. 6 is a schematic view of an image diagnostic apparatus according to the second embodiment.

FIG. 6 illustrates a tomogram measurement apparatus according to this embodiment. As shown in FIG. 6, the tomogram measurement apparatus according to this embodiment is a PET apparatus with detectors arranged so as to surround an object. One detector is arranged to detect radiation emitted by an opposing detector, thereby obtaining measurement data. Note that the detector arrangement pattern is not limited to the circular pattern shown in FIG. 6.

Figure 7:
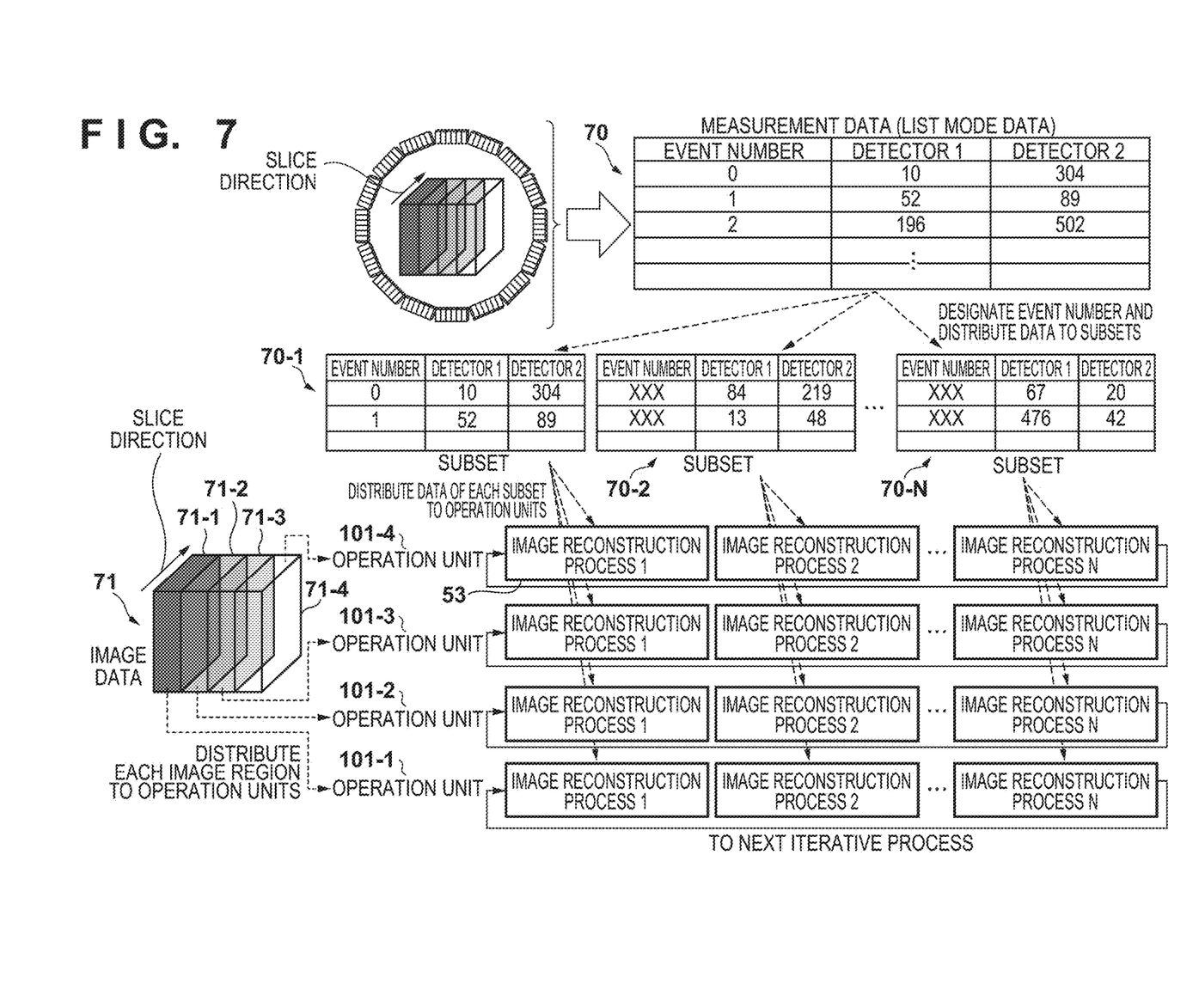
FIG. 7 is a conceptual view of processes according to the second embodiment.

FIG. 7 is a conceptual view of processes according to this embodiment. Note that the image reconstruction process shown in FIG. 1, the image reconstruction means shown in FIG. 2, and the image reconstruction process procedure shown in FIGS. 3A and 3B are the same as in the first embodiment, and a description thereof will be omitted. Points different from the first embodiment will mainly briefly be described. In this embodiment, a radiation detection time, the addresses of a detector pair (the positions of a pair of detectors), and the energy value of detected radiation are recorded in each measurement data as a detection event (list mode data), unlike the first embodiment. A measurement data division unit 103 designates a detection event (event number), thereby dividing a plurality of measurement data into a plurality of subsets. In the example of FIG. 7, measurement data 70 are divided into subsets sequentially from the upper side (sequentially from 0). That is, the measurement data division unit 103 divides a plurality of measurement data into a plurality of subsets such that each of the plurality of subsets includes measurement data obtained under different conditions. Note that the subset division method is not limited to this. For example, event numbers may be designated at a predetermined interval. A measurement data distribution unit 104 distributes the measurement data divided into subsets by designating event numbers to the operation units, as in the first embodiment.

A flowchart showing an example of a process form executed by an image processing apparatus 100 according to this embodiment is shown in FIGS. 3A and 3B, as in the first embodiment. In this embodiment, the processes of steps S305 to S309 of FIGS. 3A and 3B correspond to an image reconstruction process 73 shown in FIG. 7. The procedure of the image reconstruction process will be described with reference to FIG. 7. First, each of operation units 101-1 to 101-4 performs one iterative process (image reconstruction process 1) for the data of event number 0 out of a subset 70-1 to obtain a back projection result. Next, each of the operation units 101-1 to 101-4 performs one iterative process (image reconstruction process 1) for the data of event number 1, and multiplies the back projection result obtained in this process by the back projection result obtained in the preceding process. Such a process is performed as many times as the number of event numbers included in the subset 70-1. After the iterative processes for the subset 70-1 have ended, the process target shifts to a subset 70-2. The iterative processes (image reconstruction processes 2) are performed, as in the subset 70-1. In the example of FIG. 7, if the end condition is not met after the end of the process up to a subset 70-N (step S311), image reconstruction process 1 is performed again.

The reason why an image reconstruction process for large-scale data that cannot be held on an operation unit can be performed will be described here in detail. The image size is assumed to be the same as in the first embodiment. On the other hand, measurement data is assumed to have a size corresponding to 500M events. A radiation detection time, the addresses of a detector pair (the positions of a pair of detectors), and the energy value of detected radiation are recorded in each event. When a numerical value is handled as an int type, the amount of the measurement data is about 6 GB. Arrays necessary to calculate a successive approximation image reconstruction method are two arrays for the measurement data size and four arrays for the reconstructed image size, as in the first embodiment. Hence, if all data are distributed to the operation units without being divided, a memory size of 29 GB or more is necessary. When the successive approximation image reconstruction method is implemented by using four GPUs for the operation units and setting the number of subsets to 8, the sizes of data distributed to each operation unit are about 1.07 GB for divided image data and 0.75 GB for divided measurement data. Hence, the data size distributed to the GPU can be decreased to about 5.78 GB in total, and the data can be held on the memory of the GPU.

Note that in this embodiment, a PET image reconstruction process using list mode data has been described. When a histogram mode data in which the number of detection events of each detector pair is recorded is used, the measurement data division unit 103 divides measurement data by designating projection angles as described in the first embodiment.

In this embodiment, by performing such process control, a PET image reconstruction process for large-scale data that cannot be held on operation units can be implemented using a plurality of operation units.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-083706, filed Apr. 15, 2015, which is hereby incorporated by reference herein in its entirety.

What is claimed is:

1. An image processing apparatus for generating a reconstructed image by performing a reconstruction process including a repetitive operation using a plurality of operation units, comprising:
   a memory storing a program; and
   one or more processors which, by executing the program, function as:
      an obtaining unit configured to obtain a plurality of measurement data of an object;
      a division unit configured to divide the plurality of measurement data into a plurality of subsets;
      a distribution unit configured to distribute the measurement data included in the plurality of subsets to the plurality of operation units in repetitive operation;
      a reconstruction processing unit configured to update results obtained by the plurality of operation units using the distributed measurement data, thereby performing the reconstruction process and generating partial reconstructed images on the plurality of operation units; and
      a combining unit configured to combine the partial reconstructed images to generate the reconstructed image,
   wherein a projection angle index corresponding to the projection angle is added to the measurement data, and the division unit designates the projection angle index, thereby dividing the plurality of measurement data into the plurality of subsets.

2. The apparatus according to claim 1, wherein the division unit divides the plurality of measurement data into the plurality of subsets such that each of the plurality of subsets includes measurement data of different projection angles.

3. The apparatus according to claim 2, wherein the image processing apparatus comprises a computed tomography (CT) apparatus.

4. An image processing apparatus for generating a reconstructed image by performing a reconstruction process including a repetitive operation using a plurality of operation units, comprising:
   a memory storing a program; and one or more processors which, by executing the program, function as:
an obtaining unit configured to obtain a plurality of measurement data of an object;
a division unit configured to divide the plurality of measurement data into a plurality of subsets;
a distribution unit configured to distribute the measurement data included in the plurality of subsets to the operation units in repetitive operation;
a reconstruction processing unit configured to update results obtained by the plurality of operation units using the distributed measurement data, thereby performing the reconstruction process and generating partial reconstructed images on the plurality of operation units; and
a combining unit configured to combine the partial reconstructed images to generate the reconstructed image,
wherein the obtaining unit comprises a plurality of detection units arranged so as to surround the object, one detection unit out of the plurality of detection units arranged to face each other to detect radiation emitted by an opposing detector, thereby obtaining the measurement data, and
wherein the division unit divides the plurality of measurement data into the plurality of subsets such that the plurality of subsets includes measurement data obtained under different conditions.

5. The apparatus according to claim 4, wherein a radiation detection time, positions of a pair of detectors, and an energy value of detected radiation are recorded in each measurement data as a detection event, and the division unit designates the detection event, thereby dividing the plurality of measurement data into the plurality of sub sets.

6. The apparatus according to claim 4, wherein the image processing apparatus comprises a positron emission tomography (PET) apparatus.

7. An image processing method of generating a reconstructed image by performing a reconstruction process including a repetitive operation using a plurality of operation units, comprising:
obtaining a plurality of measurement data of an object;
dividing the plurality of measurement data into a plurality of subsets;
distributing the measurement data included in the plurality of subsets to the plurality of operation units in repetitive operation;
updating results obtained by the plurality of operation units using the distributed measurement data, thereby performing the reconstruction process and generating partial reconstructed images on the plurality of operation units; and
combining the partial reconstructed images to generate the reconstructed image,
wherein a projection angle index corresponding to the projection angle is added to the measurement data, and the plurality of measurement data are divided into the plurality of subsets by designating the projection angle index.

8. A non-transitory computer readable medium storing a computer-executable program for causing a computer to perform an image processing method of generating a reconstructed image by performing a reconstruction process including a repetitive operation using a plurality of operation units, the method comprising:
obtaining a plurality of measurement data of an object;
dividing the plurality of measurement data into a plurality of subsets;
distributing the measurement data included in the plurality of subsets to the plurality of operation units in repetitive operation;
updating results obtained by the plurality of operation units using the distributed measurement data, thereby performing the reconstruction process and generating partial reconstructed images on the plurality of operation units; and
combining the partial reconstructed images to generate the reconstructed image,
wherein a projection angle index corresponding to the projection angle is added to the measurement data, and the plurality of measurement data are divided into the plurality of subsets by designating the projection angle index.

9. The apparatus according to claim 1, further comprising:
another division unit configured to divide an image region into a plurality of regions; and
another distribution unit configured to distribute the plurality of regions to the operation units,
wherein the obtaining unit obtains the plurality of measurement data from a measurement apparatus for obtaining the plurality of measurement data, and
wherein the reconstruction processing unit updates the results obtained by the plurality of operation units in distributed region information.

10. An image processing method of generating a reconstructed image by performing a reconstruction process including a repetitive operation using a plurality of operation units, comprising:
obtaining a plurality of measurement data of an object;
dividing the plurality of measurement data into a plurality of subsets;
distributing the measurement data included in the plurality of subsets to the operation units in repetitive operation;
updating results obtained by the plurality of operation units using the distributed measurement data, thereby performing the reconstruction process and generating partial reconstructed images on the plurality of operation units; and
combining the partial reconstructed images to generate the reconstructed image,
wherein a plurality of detectors are arranged so as to surround the object,
wherein the measurement data is obtained by one detector out of the plurality of detectors arranged to face each other to detect radiation emitted by an opposing detector, and
wherein the plurality of measurement data are divided into the plurality of subsets such that the plurality of subsets includes measurement data obtained under different conditions.

11. A non-transitory computer readable medium storing a computer-executable program for causing a computer to perform an image processing method of generating a reconstructed image by performing a reconstruction process including a repetitive operation using a plurality of operation units, the method comprising:
obtaining a plurality of measurement data of an object;
dividing the plurality of measurement data into a plurality of subsets;
distributing the measurement data included in the plurality of subsets to the operation units in repetitive operation;

updating results obtained by the plurality of operation units using the distributed measurement data, thereby performing the reconstruction process and generating partial reconstructed images on the plurality of operation units; and combining the partial reconstructed images to generate the reconstructed image, wherein a plurality of detectors are arranged so as to surround the object, wherein the measurement data is obtained by one detector out of the plurality of detectors arranged to face each other to detect radiation emitted by an opposing detector, and wherein the plurality of measurement data are divided into the plurality of subsets such that the plurality of subsets includes measurement data obtained under different conditions.

* * * * *